March 13, 1951

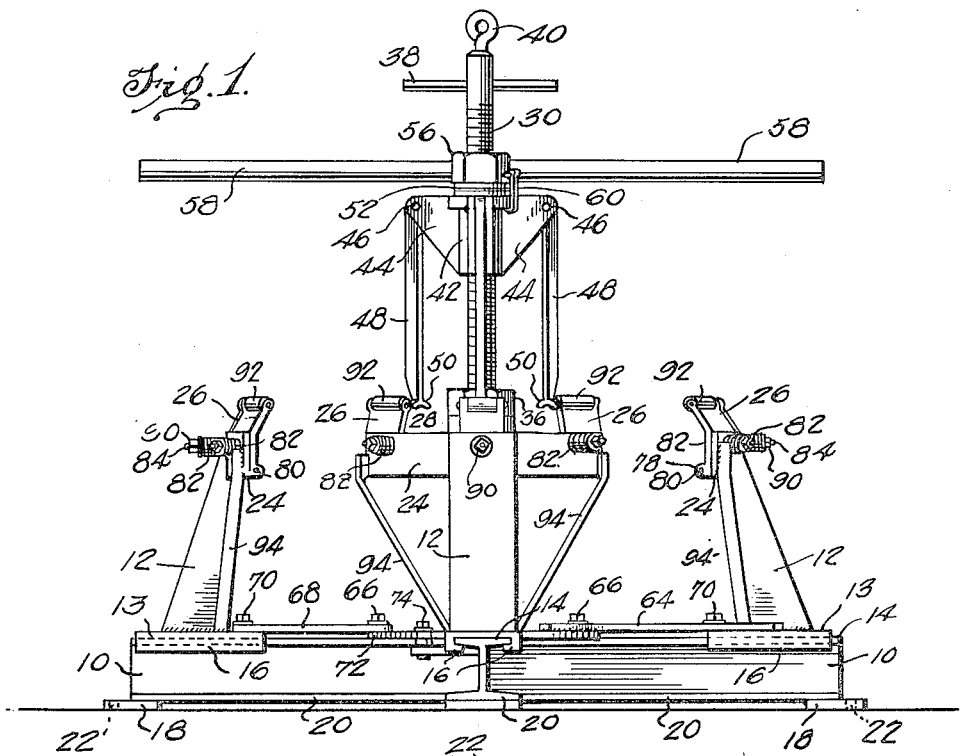

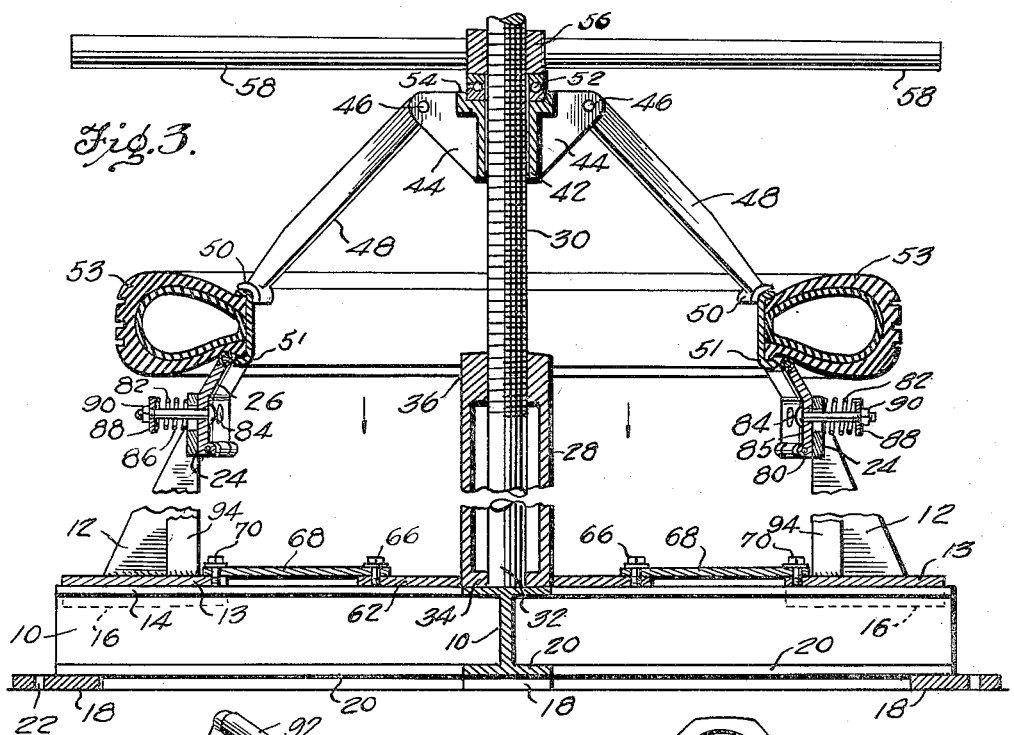
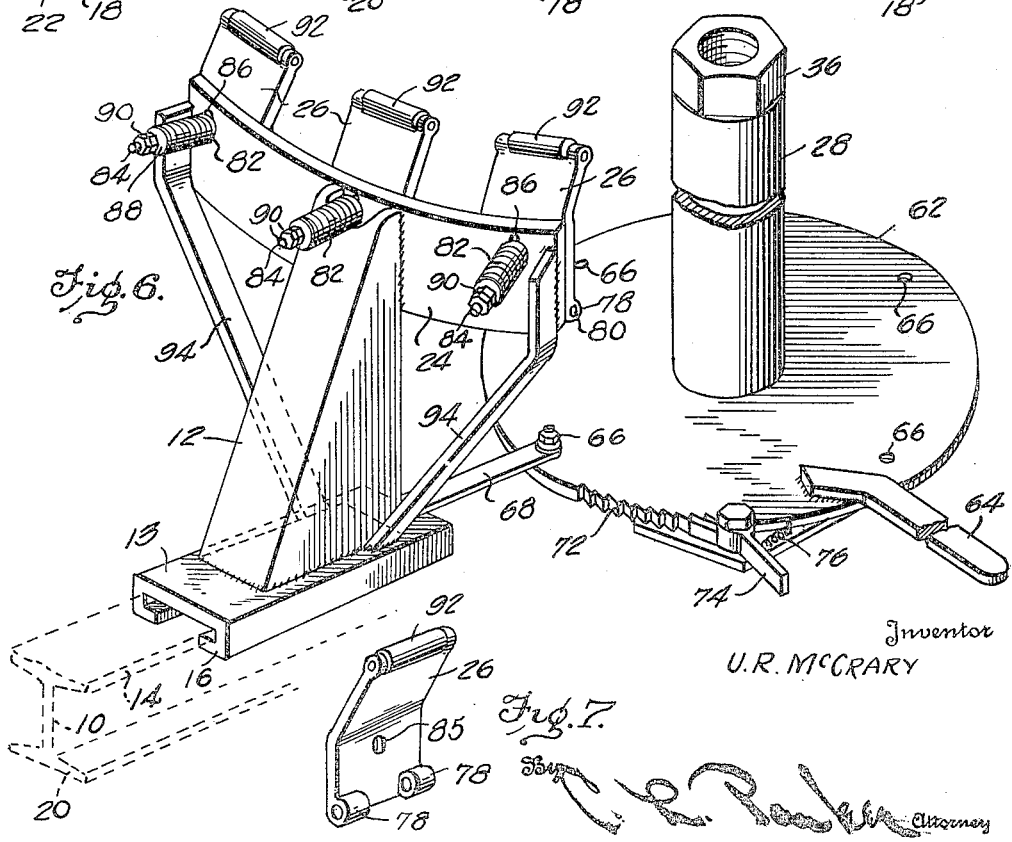

U. R. McCRARY 2,545,157

TIRE DEMOUNTING MACHINE WITH CIRCUMFERENTIALLY DISTRIBUTED THRUST MEMBERS

Filed Nov. 26, 1946

Inventor
U. R. McCRARY

Patented Mar. 13, 1951

2,545,157

UNITED STATES PATENT OFFICE 2,545,157

TIRE DEMOUNTING MACHINE WITH CIRCUMFERENTIALLY DISTRIBUTED THRUST MEMBERS

Ulysses R. McCrary, Johnson City, Tenn.

Application November 26, 1946, Serial No. 712,443

4 Claims. (Cl. 157—1.2)

This invention relates to improvements in tire demounting machines.

In the operation of automotive tire repair shops one of the most frequently presented and at the same time troublesome jobs is that of demounting a tire from its associated rim for the purpose of making any necessary repairs thereto. During this operation, and particularly in the case of large size truck tires, it frequently happens that the tire is firmly stuck to the rim as a result of rusting of the rim, chemical changes in the composition of the tire, or both, so that extremely high pressures and a great deal of manual effort are required to effect disengagement. Such tires are commonly referred to as being "frozen" to their associated rims and it is customary in such cases to employ various liquid solvents to effect the necessary separation which in turn involves a considerable time delay in completing the operation.

Accordingly the principal object of the present invention is to provide improved apparatus for disengaging a tire from a rim which will enable "frozen" tires to be quickly demounted with but little effort.

Another object of the invention is to provide tire disengaging apparatus of the type described which is substantially entirely self-contained and requires no extra attachments such as rim adapters, jacks, pins, or the like, for its successful operation.

A further object of the invention is to provide tire disengaging apparatus having novel tire engaging elements which are self-adjusting and substantially automatic in operation.

An additional object of the invention resides in the provision of a novel mechanism for rapidly and simultaneously adjusting the positions of a plurality of tire engaging elements to accommodate different rim diameters.

A still further object of the invention is to provide an extremely rugged and durable tire disengaging apparatus which may be relatively inexpensively produced and which requires a minimum of maintenance attention.

Other objects and advantages of the invention will become apparent during the course of the following description.

In the drawings I have shown one embodiment of the invention. In this showing:

Fig. 1 is a front elevation of the apparatus showing the parts in non-operating position;

Fig. 2 is a top plan view of the apparatus;

Figs. 3, 4 and 5 are transverse cross-sectional views through the apparatus illustrating the relative positions of the parts during successive stages of operation;

Fig. 6 is a detail perspective view of one of the tire engaging standards and the adjusting mechanism associated therewith; and Fig. 7 is a detail perspective view of one of the tire engaging fingers.

Figure 4:
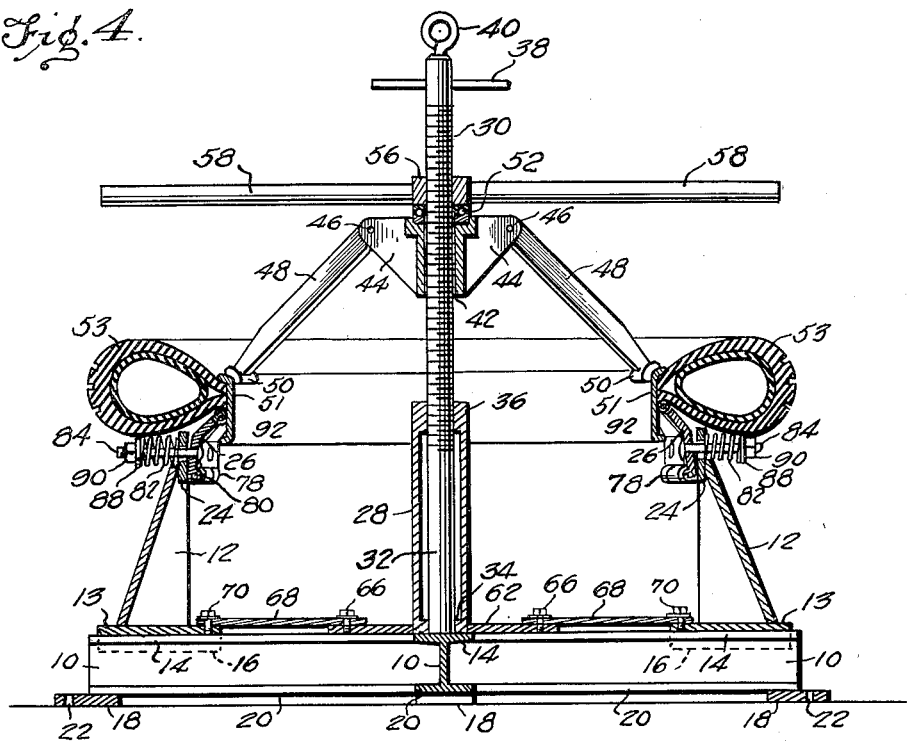

Referring to the drawings the apparatus comprises in general a base unit provided with means adapted to engage a tire, and a pressure unit mounted above the base unit for movement relative to the latter and provided with means adapted to engage the rim of the tire to force the latter downwardly relative to the tire casing. As shown particularly in Figs. 1 and 2 a plurality of I-beams 10, which have been suitably cut and joined together as by welding or the like, form a relatively rigid cross-shaped base. A plurality of standards 12 are slidably mounted on the top flanges 14 of the I-beams 10, the base 13 of each standard including downwardly and inwardly projecting lip portions 16 in sliding engagement with the bottom surfaces of the flanges 14 to guide the sliding movement of the standards 12 and to prevent vertical displacement of the latter relative to the I-beams 10.

The standards 12 are preferably formed as metal stampings, although obviously castings or similar structures could be employed if desired. The I-beams 10 are provided at their outer portions with feet or mounting lugs 18 attached, as by means of welding, to the under side of the bottom flanges 20 of the I-beams 10 and provided with apertures 22 adapted to receive suitable hold-down bolts or the like (not shown) for firmly attaching the base to the floor or other supporting surface.

At their top portions the standards 12 are provided with arcuate members 24 which in turn carry a plurality of fingers 26 having means adapted to engage a tire casing. The details of construction of the arcuate members 24 and fingers 26 will be hereinafter more fully described. The base unit also includes a sleeve 28 projecting upwardly from the center thereof and adapted to receive and support the pressure unit described below.

As shown most clearly in Fig. 3 the pressure unit comprises an externally threaded shaft 30 having a smooth journal portion 32 at its bottom end, the latter being adapted to seat within a bearing 34 formed at the bottom of the sleeve 28. The sleeve 28 is provided with an internally threaded upper end portion 36 in threaded engagement with the shaft 30 when the latter is in operating position. A crossbar 38 (Fig. 1) passes through the top of the shaft 30 and is adapted to be employed for manually rotating the latter in assembling the shaft 30 within the sleeve 28.

An eye-bolt 40 or the like is secured in the top of the shaft 30 in position to be engaged by any suitable lifting apparatus for lifting the pressure unit and retaining it in an out of the way position when not in use. A sleeve 42 is freely slidable along the shaft 30 and includes a plurality of clevises 44, preferably three in number, projecting laterally therefrom each including a pivot pin 46. Thrust arms 48 are pivoted at one end to the pivot pins 46 and are provided at their opposite ends with curved fittings 50 shaped to conform generally to the inner edge of a tire rim and adapted to be engaged therewith as shown in Figs. 3 and 4.

An antifriction device, illustrated in the present case as a ball thrust bearing 52, is also freely slidable along the shaft 30 and is seated within a counterbore 54 formed in the top of the sleeve 42. A collar 56 is threaded on the shaft 30 above the thrust bearing 52 and includes a plurality of operating arms 58 extending laterally therefrom to provide adequate leverage in rotating the collar. Since the sleeve 42 and thrust bearing 52 are freely slidable along the shaft 30 a pivoted latch 60 is provided for retaining these members in the raised position illustrated in Fig. 1 when the apparatus is not in use.

The mechanism for simultaneously sliding the standards 12 along the top flanges 14 of the I-beams 10 is best illustrated in Figs. 2 and 6. This mechanism comprises a disc 62 rotatably surrounding the bottom portion of the sleeve 28 and having an operating handle 64 extending outwardly therefrom. A plurality of pivots 66 corresponding in number to the standards 12 are substantially equally spaced about the periphery of the disc 62 and a plurality of arms 68 are rotatably mounted at one end on the pivots 66 and at their opposite ends on similar pivots 70 provided in the bases 13 of the standards 12.

A sector of the peripheral edge of the disc 62 is provided with ratchet teeth 72 adapted to cooperate with a pawl 74 which is constantly urged into engagement therewith by means of a spring 76. It will be seen from the above description that rotation of the disc 62 about the sleeve 28 by means of the handle 64 will produce a corresponding linear movement of the standards 12 along their associated I-beams by means of the pivoted connecting arms 68. The spring pressed ratchet 74 serves to prevent rotation of the disc 62 in one direction for a reason which will hereinafter be more fully explained.

Referring now particularly to Figs. 3, 6 and 7, the structure and mounting of the tire engaging fingers 26 is illustrated in detail. It will be noted that each of the fingers 26 is provided with hinge bearings 78 at its bottom edge adapted to receive hinge pins 80 which are also received within similar hinge bearings (not shown) formed on the inner bottom edge of the arcuate members 24.

Each of the fingers 26 is thus hingedly mounted at its lower end on one of the arcuate members 24 and may swing radially inwardly relative to its outer limit position. Opposing this inward pivoting movement of the fingers 26 are springs 82 mounted on bolts 84 which extend from the inner faces of the fingers 26 through apertures 85 in the fingers 26 and through apertures 86 formed in the arcuate members 24. The springs 82 are in compression between the outer face of each arcuate member 24 and washers 88 held in place on the bolts 84 as by means of nuts 90.

Antifriction means in the form of rollers 92 are provided on the top ends of the fingers 26. As illustrated in Fig. 6 a plurality of side braces 94 extend between the bases 13 of the standards 12 and the outer extremities of the arcuate members 24. It is to be particularly noted that each of the fingers 26 is bent inwardly so that the axes of the rollers 92 and the hinge pins 80 lie in different vertical planes for a reason which will become apparent below.

Figure 5:
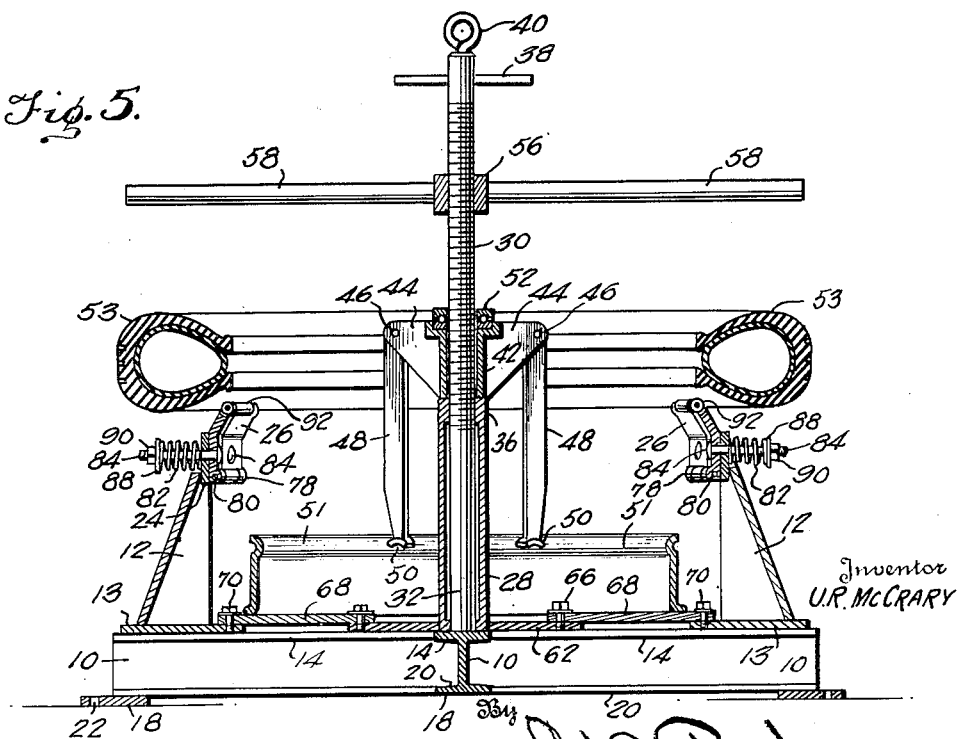

The operation of the device will be clear from a consideration of Figs. 3, 4 and 5, which illustrate a sequence of tire disengaging operations. The initial step in a complete disengaging cycle is not illustrated in the drawings but briefly comprises unscrewing the shaft 30 from the sleeve 28, removing the entire pressure unit from the base, placing a "frozen" tire upon the fingers 26, and reassembling the pressure unit to the base by screwing the shaft 30 into the sleeve 28. After this initial operation the parts will be approximately in the positions illustrated in Fig. 3. At this time the spring-pressed pawl 74 is manually disengaged and the operating handle 64 moved to slide the standards 12 radially outwardly from the sleeve 28 to make sure that the fingers 26 lie outwardly of and are not in engagement with the rim 51 of the tire 53. The pawl 74 is then released to its engaging position and the operating handle 64 moved to bring the fingers 26 radially inwardly until they are just clear of the rim 51. The thrust arms 48 are then swung outwardly and the collar 56 rotated to move the sleeve 42 and arms 48 downwardly until the curved fittings 50 are in proper position to be engaged with the upper edge of the rim 51. The apparatus as shown in Fig. 3 is now in proper position to begin a disengaging operation.

Fig. 4 illustrates the intermediate operating position which the parts assume a short time after the disengaging operation has begun. At this time the rotation of the collar 56 by the operating arms 58, by exerting pressure through the thrust bearing 52, the sleeve 42, and thrust arms, has resulted in forcing the rim 51 a short distance downwardly relative to the base of the apparatus. The point to be particularly noted in Fig. 4 is that the fingers 26 have been pivoted inwardly as a result of the pressure upon the rim 51 so that the rollers 92 are now in sliding engagement with the outer surface of the rim. The springs 82 are now compressed tending to pivot the fingers 26 outwardly, and the lower bead of the tire has been disengaged from the bottom flange of the rim and has been moved upwardly an appreciable distance.

The inward pivoting of the fingers 26 is entirely automatic and occurs on account of the angular shape thereof coupled with the fact that the application of downward pressure to the rim 51 is in a substantially vertical direction, radially inwardly of the pivot pins 80. During the inward pivoting action of the fingers 26, and in fact throughout the disengaging operation, any tendency of the pressure unit to force the standards 12 radially outwardly is resisted by the ratchet 74.

Attention is invited to the fact that the present apparatus is capable of use with rims of any type, for example, those having fixed flanges at opposite sides, as shown in Figures 3 and 4, and those having one removable flange. In the latter case, the apparatus operates to completely remove the tire from the rim, as in Figure 5. With rims having two fixed flanges, the "frozen" beads of the tire are broken loose from the rim, the rim being reversed if necessary to break loose the second bead of the tire after the first one has been loosened. With rims of such type, the actual removal of the tire is accomplished by removing the rim and tire from the present apparatus, and then removing the tire from the rim by conventional methods, for example, by the use of tire irons.

Attention also is particularly invited to the fact that the arms 26 are biased radially outwardly by the springs 82. The pressure exerted by the present apparatus in loosening a bead from a tire causes the arms 26 to spring radially inwardly against their biasing means. However, when loosening the beads of tires mounted on drop-center rims, the springs 82 exert sufficient bias radially outwardly to prevent the rollers 92 from dropping into the center groove of the rim. Attention also is invited to the fact that rollers 92 are arranged tangential to a circle having its axis coincident with the axis of the rim, and accordingly, these rollers operate very smoothly and easily across the rim and greatly facilitate the application of forces to a substantial number of points to loosen the tire, with a minimum of effort on the part of the operator.

The final position of the parts at the completion of a disengaging operation is illustrated in Fig. 5. At this time the rim 51 has been completely disengaged from the tire 53 by the application of pressure resulting from continued rotation of the collar 56. As the latch 60 is not in position during operation of the apparatus, the sleeve 42 and thrust arms 48 as well as the thrust bearing 52 have now dropped down to the position shown in Fig. 5 by the action of gravity once the upward resistance of the rim has ceased. The fingers 26 have once again pivoted outwardly to their starting positions as in Fig. 3 under the influence of the springs 82, and the tire 53 rests freely upon the rollers 92. The tire and rim now being completely disengaged, it is only necessary to unscrew the shaft 30 from the sleeve 28 and lift the pressure unit clear of the base, by employing the latch 60 and eye-bolt 40, at which time the tire and rim may be separately removed from the apparatus.

I claim:

1. Apparatus for demounting a tire from a rim, comprising a plurality of circularly arranged standards, an arcuate member carried by each standard and projecting generally laterally from the upper end portion thereof, said members being formed as arcs of a circle having a common center, a plurality of fingers pivotally connected at their lower ends to each of said members and engageable with a tire to fix it against movement in one direction perpendicular to its plane, the upper ends of said fingers being biased to normal outer limit positions from which they are movable inwardly under the influence of pressure on said tire in said direction to move radially inwardly thereover to engage the radially outer face of the rim, antifriction elements carried by the upper ends of said fingers to directly engage the tire and rim to facilitate the movement of the fingers thereover, and means engageable with the rim to apply a pressure thereto in said direction.

2. Apparatus for demounting a tire from a rim, comprising a plurality of circularly arranged standards, an arcuate member carried by each standard and projecting generally laterally from the upper end portion thereof, said members being formed as arcs of a circle having a common center, a plurality of fingers pivotally connected at their lower ends to each of said members and engageable with a tire to fix it against movement in one direction perpendicular to its plane, the upper ends of said fingers being biased to normal outer limit positions from which they are movable inwardly under the influence of pressure on said tire in said direction to move radially inwardly thereover to engage the radially outer face of the rim, antifriction elements carried by the upper ends of said fingers to directly engage the tire and rim to facilitate the movement of the fingers thereover, a fixed shaft coincident with said center and arranged axially with respect to the tire and rim, and means carried by said shaft and movable axially therealong in engagement with said rim to apply a pressure thereto in said direction.

3. Apparatus for demounting a tire from a rim, comprising a base, a socket on said base, a plurality of circularly arranged standards mounted on said base, an arcuate member carried by each standard and projecting therefrom, said members being formed as arcs of circles having a common center coaxial with said socket, a plurality of fingers pivoted at their lower ends to each member and engageable with a tire to prevent downward movement thereof, said fingers being biased to normal outer limit positions and being movable radially inwardly under the influence of downward force applied thereto by the tire, each finger having a roller at its upper end, said rollers being rotatable on axes tangent to circles concentric with said arcs, said fingers being directly engageable with the tire and movable radially inwardly thereover to engage and move across the radially outer face of the rim, a vertical shaft having its lower end arranged in said socket, and means having operative engagement with said shaft and being engageable with said rim to apply downward pressure thereto to disengage it from the tire.

4. Apparatus for demounting a tire from a rim, comprising a base, a socket on said base, a plurality of circularly arranged standards mounted on said base, an arcuate member carried by each standard and projecting therefrom, said members being formed as arcs of circles having a common center coaxial with said socket, a plurality of fingers pivoted at their lower ends to each member and engageable with a tire to prevent downward movement thereof, said fingers being biased to normal outer limit positions and being movable radially inwardly under the influence of downward force applied thereto by the tire, each finger having a roller at its upper end, said rollers being rotatable on axes tangent to circles concentric with said arcs, said fingers being directly engageable with the tire and movable radially inwardly thereover to engage and move across the radially outer face of the rim, a vertical shaft having its lower end arranged in said socket, means vertically movable along said shaft above the tire and rim, and thrust arms connected to said means and having portions shaped for engagement with the rim to apply downward pressure to the latter upon downward movement of said means to disengage the rim from the tire.

ULYSSES R. McCRARY.

REFERENCES CITED

The following references are of record in the file of this patent:

UNITED STATES PATENTS

| Number | Name | Date |
| --- | --- | --- |
| 1,447,113 | Woodhall | Feb. 27, 1923 |
| 1,552,928 | Hershon | Sept. 8, 1925 |
| 1,564,496 | Staugaard | Dec. 8, 1925 |
| 1,641,083 | Hite | Aug. 30, 1927 |
| 1,724,813 | Weaver et al. | Aug. 13, 1929 |
| 1,793,864 | Manley | Feb. 24, 1931 |
| 2,197,808 | Mason | Apr. 23, 1940 |
| 2,263,690 | Bradley | Nov. 25, 1941 |
| 2,423,652 | Kelley | July 8, 1947 |